(12) United States Patent
Akira et al.

(10) Patent No.: US 6,813,535 B2
(45) Date of Patent: Nov. 2, 2004

(54) EMBROIDERING DEVICE CONNECTED TO NETWORK AND THE NETWORK SYSTEM THEREOF

(75) Inventors: Orii Akira, Tokyo (JP); Kongo Takeshi, Tokyo (JP)

(73) Assignee: Janome Sewing Machine Co., Ltd., Tokyo (JP)

(*) Notice: Subject to any disclaimer, the term of this patent is extended or adjusted under 35 U.S.C. 154(b) by 0 days.

(21) Appl. No.: 10/686,338

(22) Filed: Oct. 15, 2003

(65) Prior Publication Data

US 2004/0083022 A1 Apr. 29, 2004

(30) Foreign Application Priority Data

Oct. 25, 2002 (JP) ........................................ 2002-311032

(51) Int. Cl.[7] ............................ G06F 19/00; D05C 5/02
(52) U.S. Cl. .................................... 700/138; 112/102.5
(58) Field of Search ................................ 700/138, 136, 700/137; 112/102.5, 470.04, 470.05, 470.06, 470.01, 475.19, 445, 155

(56) References Cited

U.S. PATENT DOCUMENTS

| | | | | |
|---|---|---|---|---|
| 5,662,055 A | * | 9/1997 | Hartwig et al. | 112/102.5 |
| 5,970,894 A | * | 10/1999 | Mase | 112/102.5 |
| 6,216,618 B1 | * | 4/2001 | Goldberg et al. | 112/470.04 |

* cited by examiner

Primary Examiner—Peter Nerbun
(74) Attorney, Agent, or Firm—Nields & Lemack

(57) ABSTRACT

An embroidering device connected to a network and the network system thereof is disclosed, wherein an embroidering device 1 is connected to a personal computer 2 by means of wire or wireless while the personal computer 2 is connected to a network 3 including an internet and is connected to an optional server 4. An instruction is given from the embroidering device 1 to the personal computer 2 to connect the embroidering device 1 to the network 3 and thereby to the server 4. The personal computer 2 seeks a required one of the information prepared by the server 4 and downloads the sought information. For example, the personal computer 2 obtains a list of embroidery pattern data. When the user selects optional one of the pattern data, the selected pattern data is downloaded from the server 4 and transmitted to the embroidering device 1.

4 Claims, 7 Drawing Sheets

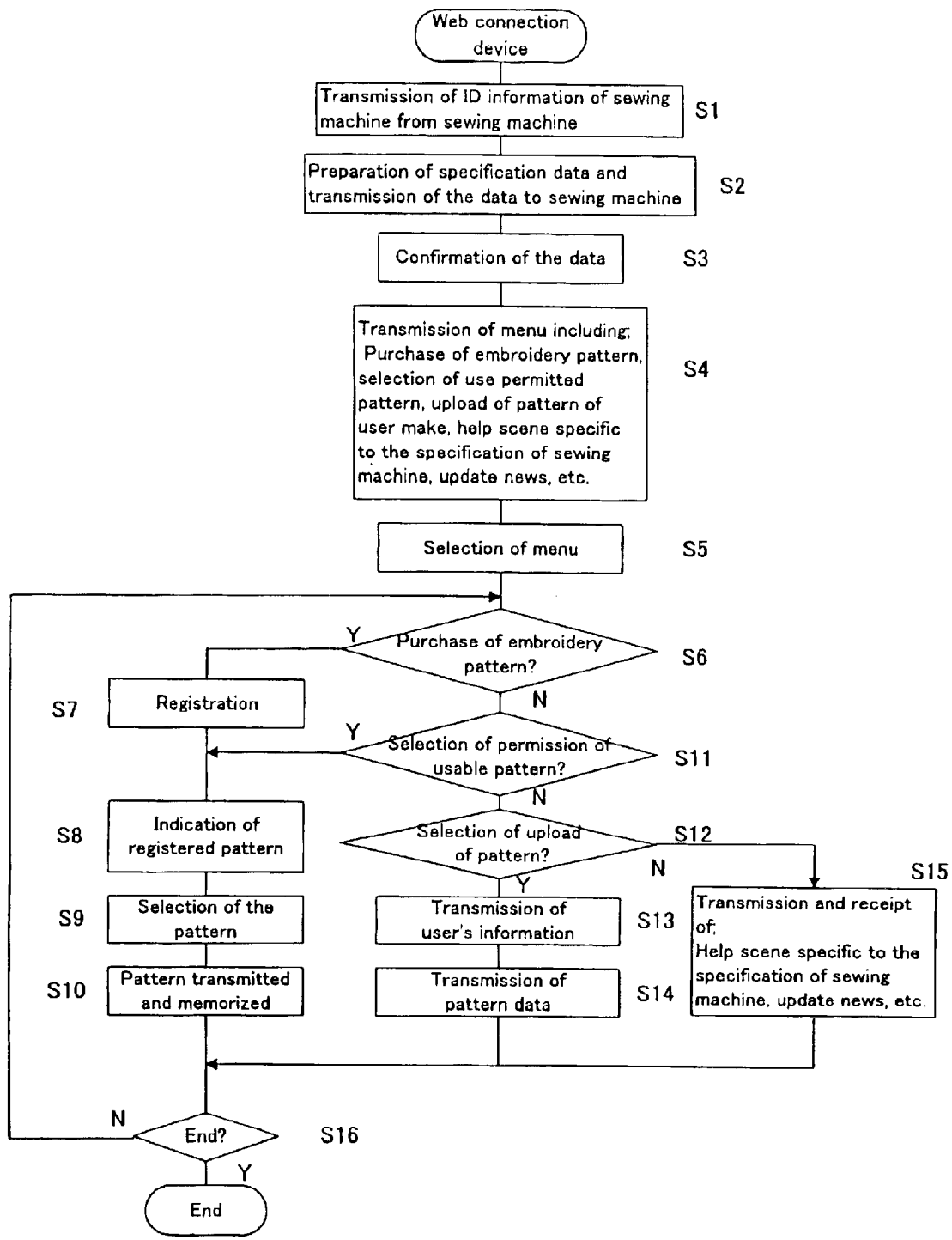

EMBROIDERING DEVICE CONNECTED TO NETWORK AND THE NETWORK SYSTEM THEREOF

BACKGROUND OF THE INVENTION

The present invention relates to an embroidering device, and more particularly relates to an embroidery stitching sewing machine which may be connected to a personal computer by wire or wireless while the personal computer is connected to a network and may be connected to an optional server, so that the machine user may optionally obtain from the server the information for embroidery stitching which is specific to the specification of the embroidery stitching sewing machine.

RELATED ART

According to the conventional embroidering device such as a sewing machine having an embroidery stitching function and a machine for exclusively stitching embroidery patterns, the pattern data of a pattern to be embroidered is read out from the memory to control the stitching operation of the embroidering device.

The memory that is generally in the form of a floppy disk or memory card having one set of pattern data stored therein is supplied by a maker to a user who purchases the memory.

However, the memory supplied by the maker generally includes the pattern data which is not necessary to the user, or the pattern data is not used in dependence upon the type of embroidering device.

A trial has been made to overcome such shortcomings by use of the internet to obtain only needed pattern data. However, in this case, a desired data is taken into a personal computer and is once stored in a memory which is to be inserted into the embroidering device for pattern stitching.

The invention has been provided to eliminate such defects and disadvantage of the prior art.

SUMMARY OF THE INVENTION

For attaining the objects, the invention comprises a means to be connected to a network, a means for taking out a desired information for embroidery stitching from a server connected to the network, a means for performing embroidery stitching on the basis of the information taken out from the server.

With the combination of elements, the embroidering device may be operated to take out a desired information of embroidery directly taken out from the server on the network into the embroidering device.

The means to be connected to the network may be connected to a specific computer connected to the network or may be directly connected to the network. In case the computer is used, the function for taking out the information may be all or partly undertaken by the computer.

A network system may be formed with the embroidering device which may be connected to the network and the server connected to the network. In this case, the embroidering device comprises a means to be connected to a network, a means for transmitting the information of the embroidering device to the server, a means for taking out information from the server, a means for performing embroidery stitching on the basis of the information taken out from the server while the server comprises a means for giving information adapted to the embroidering device on the basis of the information of the embroidering device. With the combination of elements, the server may confirm the type of the embroidering device and may give information adapted to the type of the embroidering device on the basis of the information of the embroidering device.

The information of the embroidering device may include more than one of the specification of the embroidering device such as the area in which an embroidery pattern may be stitched, the automatic thread cutting function, the thread color changing function, the area confirming function, the color indicating function, the automatic cloth presser bar lifting function, the divisional embroidering function and so on.

Further features of the invention will become more fully apparent in the following description of the embodiments of the invention and from the appended claims.

BRIEF DESCRIPTION OF THE DRAWINGS

FIG. 7 is a flow chart showing the operation of the network system of the invention by way of example.

DETAILED DESCRIPTION OF THE PREFERRED EMBODIMENTS

The invention will be described in detail in reference to the attached drawings.

Figure 1:
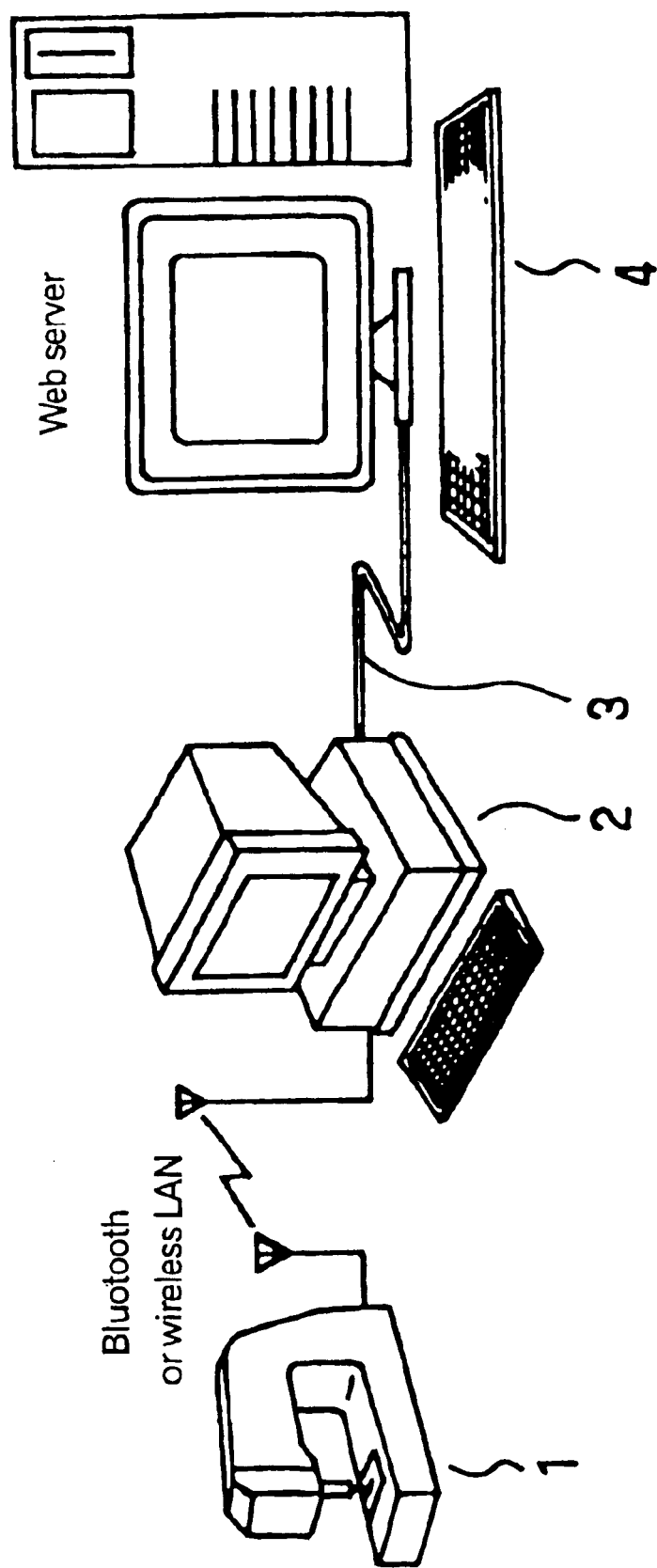
FIG. 1 is a diagrammatical view of invention shown by way of example.

FIG. 1 shows an entire system of the invention, wherein an embroidering device 1 that is an embroidery stitching sewing machine is connected to a personal computer 2 by wire or wireless while the personal computer 2 is connected to a network 3 including an internet and may be connected to an optional server 4.

Figure 2:
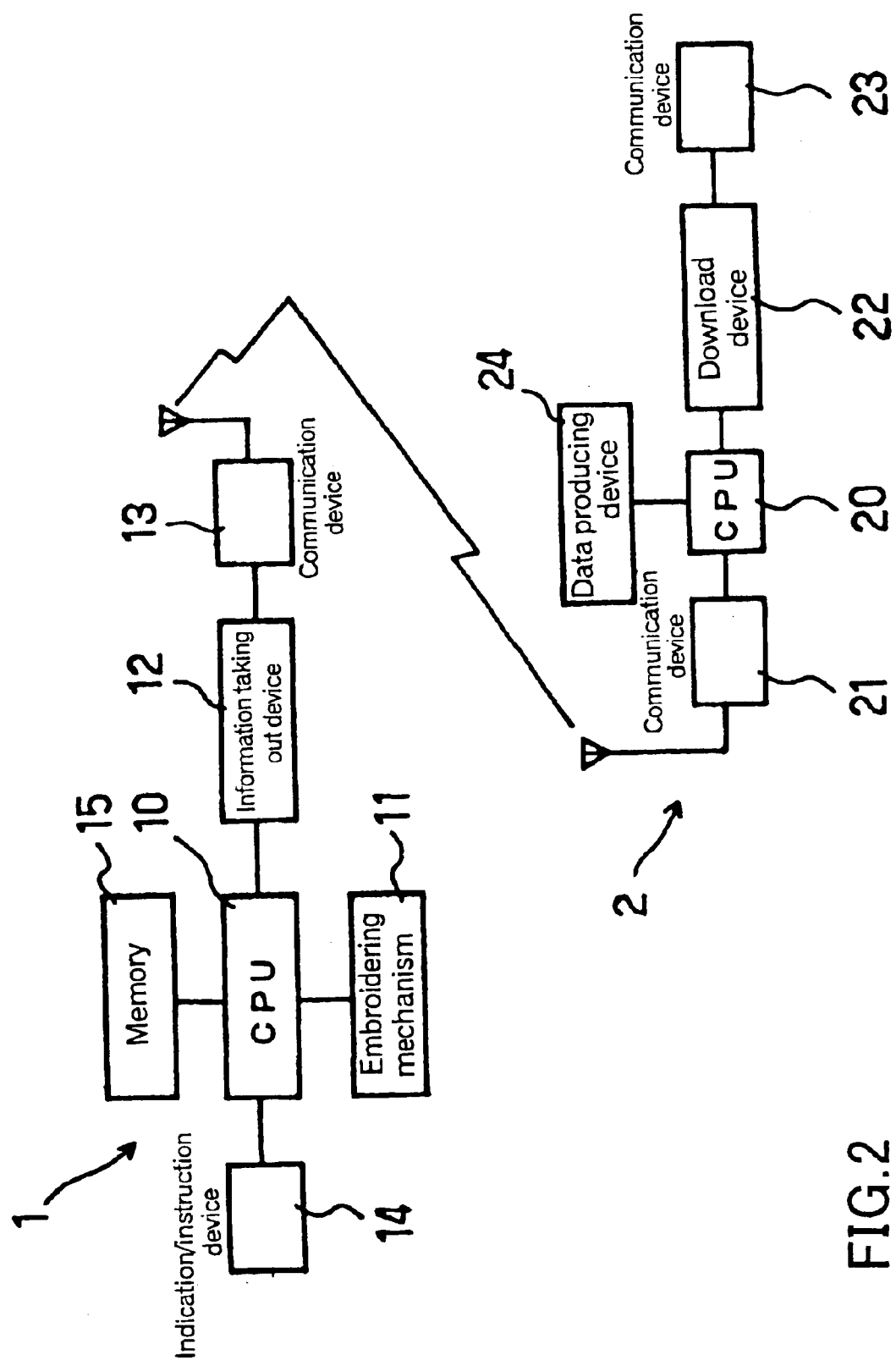
FIG. 2 is block diagram showing the invention by way of example.

As shown in FIG. 2, the embroidering device 1 is provided with a CPU 10, an information taking out device 12 and a communication device 13. The communication device 13 is a device to be connected to the personal computer 2 through the wire or wireless. The CPU 10 is provided to control the operation of an embroidering mechanism 11 of the embroidering device 1 under control of a predetermined information.

The embroidering device 1 is further provided with an indication/instruction device 14 which is to give various indications thereat and has a touch panel to be operated to give various instructions to the CPU 10. The embroidering device 1 is further provided with a memory 15.

The personal computer 2 is provided with a communication device 21 by which to communicate with the communication device 13 of the embroidering device 1. The communication device 21 is connected to a CPU 20 to transmit the instruction from the CPU 10 to the CPU 20 and to transmit the information from the CPU 20 to the CPU 10.

The CPU 20 is provided with a download device 22 and a communication device 23 by which to be connected to the network 3.

The CPU 20 is further provided with a data producing device 24 which is formed to produce the data for icons to be indicated at the indication/instruction device 14.

Incidentally, the elements of the personal computer 2 may be incorporated in the embroidering device 1.

The server 4 is connected to the network 3 to give the information of embroidering patterns to a client. The server 4 may be so formed as to be accessed exclusively by specific clients.

The operation of the invention will be described in reference to FIGS. 3 through 5.

Figure 3:
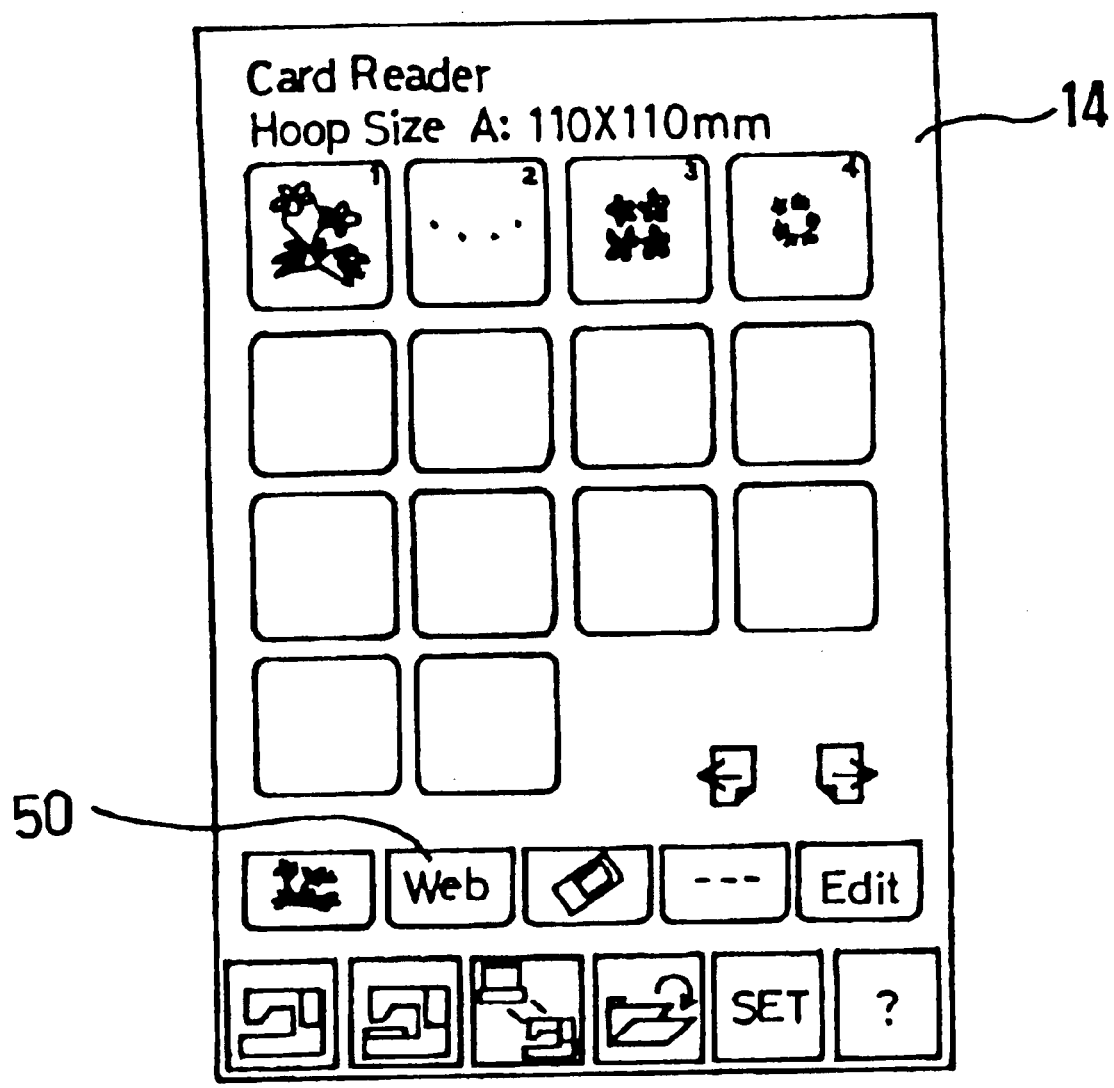
FIG. 3 is an explanatory view of one aspect of the invention shown by way of example.

At the scene of the indication/instruction device 14 as shown in FIG. 3, when the user pushes the Web button 50 which is provided in the scene, an instruction is given to the personal computer 2 to connect the embroidering device 1 to the network 3 and thereby to the server 4.

Then the personal computer 2 seeks required one of the information prepared by the server 4 and downloads the information through the download device 22.

For example, in case the required information is a pattern information, the personal computer 2 seeks a classified pattern list corresponding to the type of the embroidering device 1 and the type of data and downloads the list.

Then the data producing device 24 produces the icons on the basis of the classified pattern list and transmit the icons to the embroidering device 1.

Figure 4:
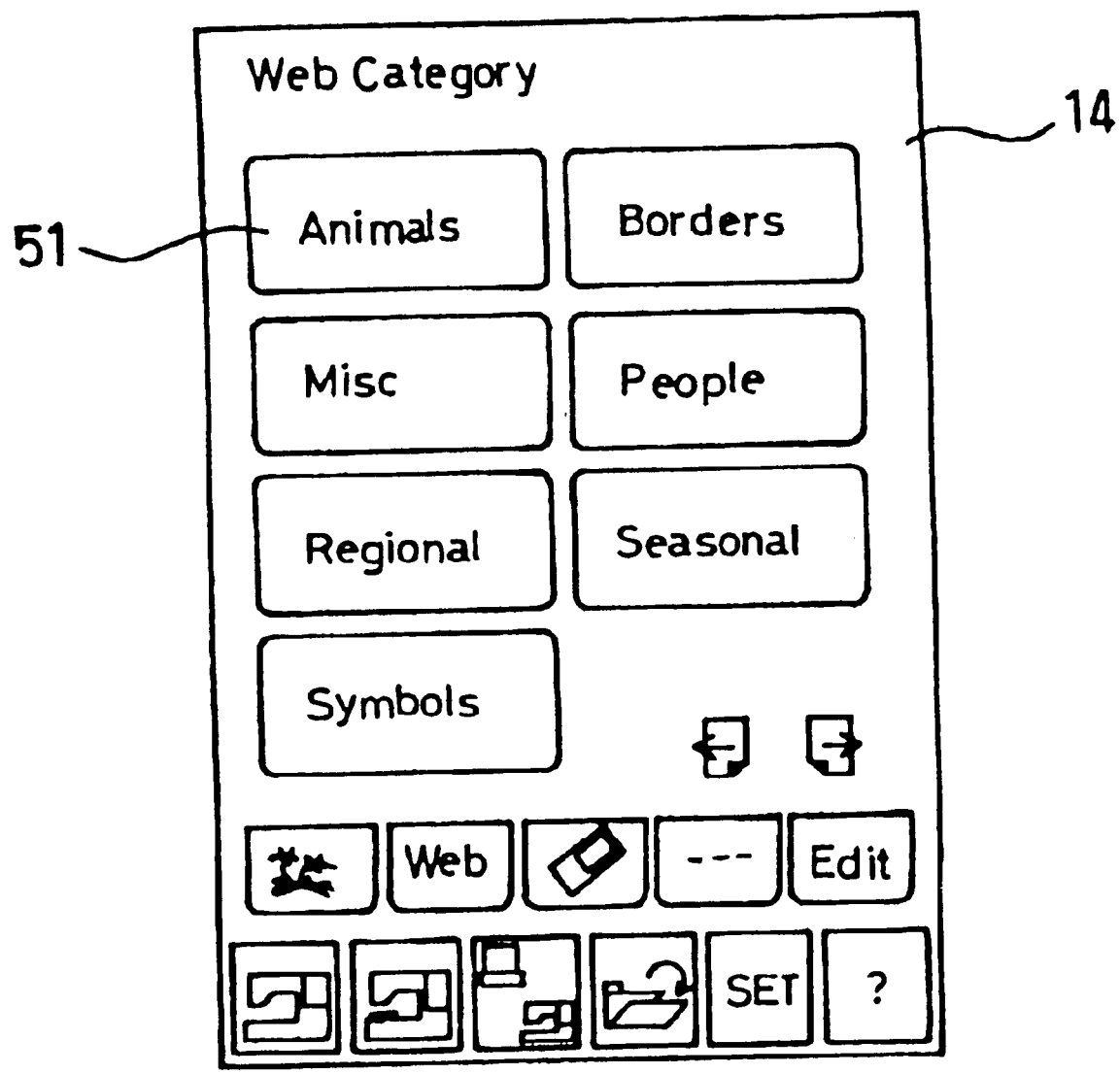
FIG. 4 is an explanatory view of another aspect of the invention shown by way of example.

As shown in FIG. 4, the classified pattern list is indicated at the indication/instruction device 14 in the form of so many classes selecting buttons 51 so that the user may select an optional one.

Figure 5:
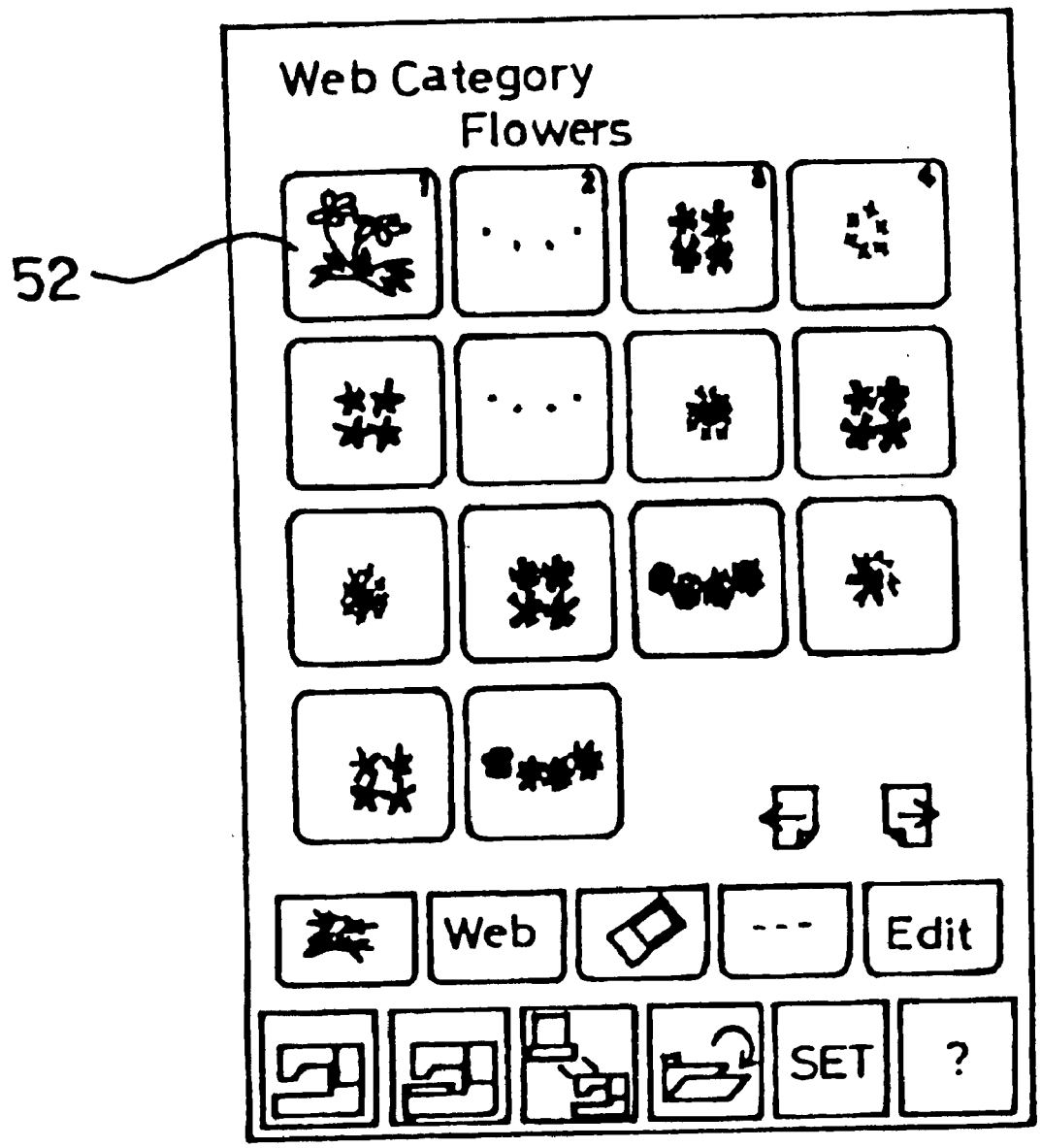
FIG. 5 is an explanatory view of still another aspect of the invention shown by way of example.

When the user pushes optional one of the buttons 51 plural times, the embroidery pattern data are indicated at the indication/instruction device 14 in the form of so many pattern selecting buttons 52 as shown in FIG. 5.

When the user pushes an optional one of the pattern selecting buttons 52, the pattern code corresponding to the pushed pattern selecting button 52 is sent to the personal computer 2. Then the personal computer 2 downloads the pattern data of the pattern code from the server 4 and transmits the pattern data to the embroidering device 1. Then the pattern data is stored in the memory 15 of the embroidering device 1

The pattern data once stored in the memory 15 may be used thereafter regardless of the server 4.

Incidentally, in case the download of the pattern data is to be charged, an optional charging system may be provided.

Figure 6:
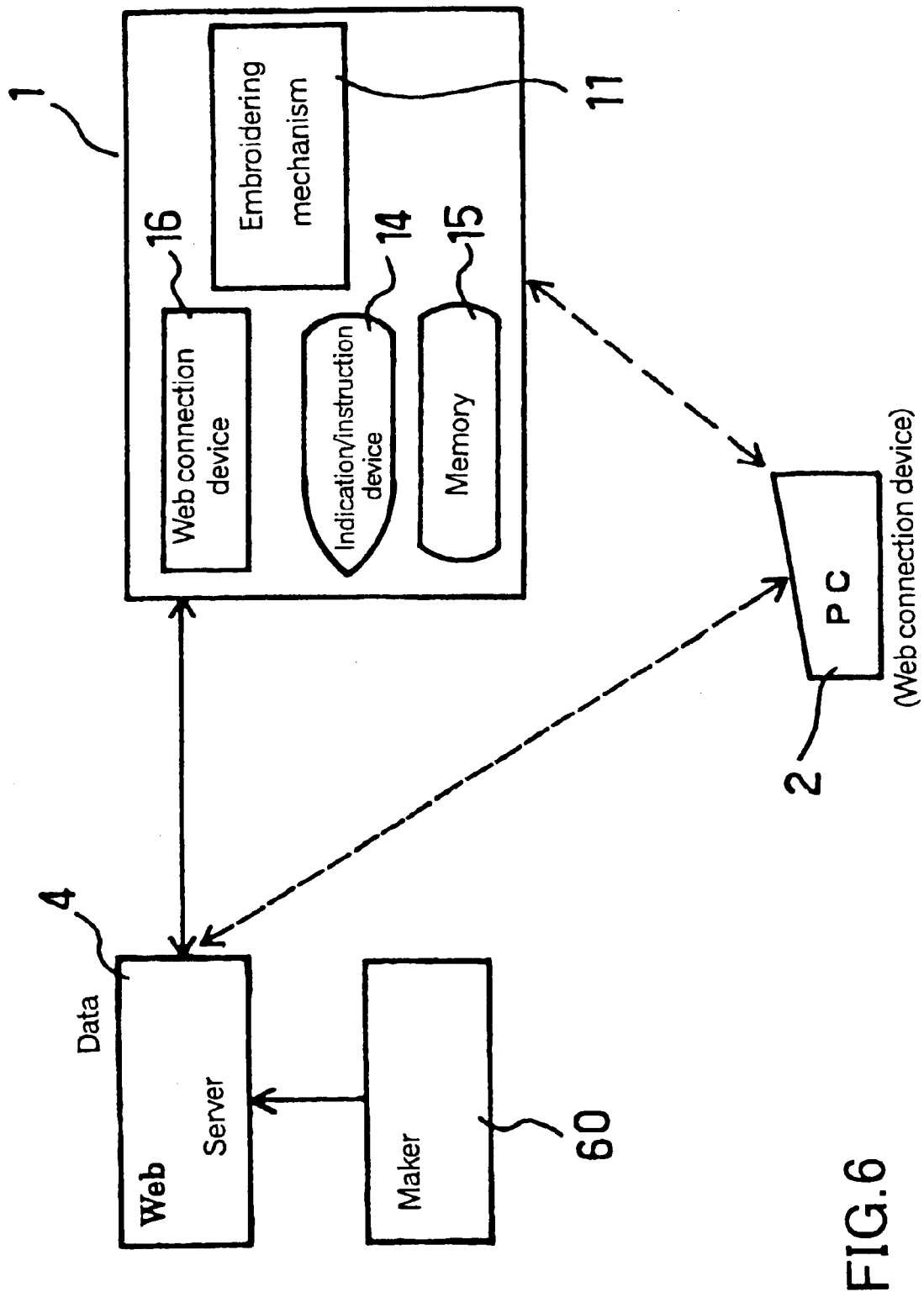
FIG. 6 is block diagram showing a network system of the invention by way of example.

In reference to FIGS. 6 and 7, the embroidering device 1 is provided with an Web connection device 16 for directly connecting the embroidering device 1 to the server 4 while the server 4 is connected to a maker 60 in the network. Incidentally, the Web connection may be made exclusively by the personal computer 2.

According to the network, an ID information is issued from the embroidering device 1 to the server 4. The server 4 returns a specification data to the embroidering device 1 on the basis of the ID information, and the user on the side of the embroidering device 1 makes confirmation of the specification. This will be described in reference to FIG. 7. Incidentally, an embroidery sewing machine is used here as the embroidering device 1.

When the embroidering device 1 is connected to the server 4 by means of the Web connection device 16, the ID information is transmitted to the server 4 from the embroidering device 1 (step S1). The ID information may be automatically transmitted to the embroidering device 1 at the time of connection of the embroidering device 1 to the server 4 while the ID information is registered beforehand, or may be optionally designated by the user.

As the ID information, the specification of the embroidering device 1 may be used. The specification includes, for example, the area in which an embroidery pattern may be stitched, that is, the embroidering area, the automatic thread cutting function, thread changing function, the embroidering area confirming function, the color indicating function, the automatic cloth presser bar lifting function, the divisional embroidering function and so on.

Upon receipt of the ID information, the server 4 prepares the specification data corresponding to the ID information and transmits the data to the embroidering device 1 (step S2). When the user confirms the specification and gives the confirmation signal (step S3), the server 4 transmits the menu corresponding to the embroidering device 1 of the specification (step S4).

The menu includes the purchase of a pattern which may be embroidered, that is, the embroidery pattern, the selection of a pattern which may be permitted to use, the upload of a pattern that is made by the user, the help scene which is specific to the specification of the sewing machine, the update news and so on.

When the user selects the menu (step S5), the corresponding data treatment is performed.

When the user selects the purchase of embroidery pattern (step S6), a registration mode is provided (step S7). When the registration is made, the indication data of the patterns which may be used is transmitted from the server 4 and is indicated (step S8). Then when the user selects one of the indicated patterns (step S9), the corresponding pattern data is transmitted from the server 4 to the embroidering device 1 and is stored in the memory 15 (step S10).

When the user selects the permission of the pattern which may be used (step S11), a jump is made to step S8 and the same operation is performed as above.

When the user selects the upload of pattern (step S12), the user's information is transmitted (step S13) and then the corresponding pattern data is transmitted (step S14)

When the user selects the help scene or the update news, the corresponding mode treatment is performed (step S15).

The operation as described above is repeated until the data treatment comes to end.

EFFECTS OF THE INVENTION

According to the invention, the user may optionally and easily obtain the necessary information including embroidery patterns. Moreover, it is needless to memorize a desired pattern once into a memory such as an IC card and then to insert the IC card into the embroidering device.

Further according to the network system of the invention, the information adapted to the type of embroidering device may be obtained on the basis of the specific information of the embroidering device.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A network system including an embroidering device and a server adapted to be connected to a network, said embroidering device comprising;

a means to be connected to said network, a means for transmitting identification information of said embroidering device to said server, a means for obtaining embroidery stitching information from said server for performing an embroidery stitching operation, a means for performing an embroidery stitching operation in accordance with said information obtained from said server, said server being so formed as to give information specific to said embroidering device on the basis of said identification information of said embroidering device.

2. An embroidering device adapted to be connected to a network having a server connected thereto, said server provided with a means for giving information specific to said embroidering device on the basis of identification information from said embroidering device, said embroidering device comprising:

a means to be connected to said network, a means for transmitting information to said server, a means for obtaining from said server embroidery stitching information for performing embroidery stitching operation which is specific to said embroidering device, a means for indicating said embroidery stitching information obtained from said server, and a means for performing embroidery stitching operation on the basis of said information indicated by said indicating means.

3. An embroidering device adapted to be connected to a network having a server connected thereto, said server being provided with a means for communicating information specific to said embroidering device on the basis of identification information which is specific to said embroidering device, said embroidering device comprising:

a means to be connected to said network, and a means for transmitting to said server said identification information which is specific to said embroidering device, a means for obtaining from said server embroidery stitching information for performing an embroidery stitching operation which is specific to said embroidering device, a means for indicating said information obtained from said server, and a means for performing embroidery stitching operation on the basis of the information indicated by said indicating means.

4. An embroidering device adapted to be connected to a network having a server connected thereto, said server provided with a means for communicating identification information specific to said embroidering device, said embroidering device comprising:

a means to be connected to said network, a means for transmitting to said server said identification information which is specific to said embroidering device, a means permitted to be connected to said server on the basis of said identification information which is specific to said embroidering device, said means obtaining from said server embroidery stitching information for performing an embroidery stitching operation which is specific to said embroidering device, a means for indicating said information obtained from said server, and a means for performing embroidery stitching operation on the basis of the information indicated by said indicating means.

* * * * *